United States Patent
Norman et al.

(10) Patent No.: US 8,994,836 B2
(45) Date of Patent: Mar. 31, 2015

(54) BEAM STEERING ELEMENT FEED FORWARD COMMAND AIDING ARCHITECTURE

(71) Applicant: Raytheon Company, Waltham, MA (US)

(72) Inventors: Walter W. Norman, Allen, TX (US); David E. Norman, McKinney, TX (US); David A. Kluver, Sr., Allen, TX (US)

(73) Assignee: Raytheon Company, Waltham, MA (US)

( * ) Notice: Subject to any disclaimer, the term of this patent is extended or adjusted under 35 U.S.C. 154(b) by 51 days.

(21) Appl. No.: 13/776,806

(22) Filed: Feb. 26, 2013

(65) Prior Publication Data

US 2013/0242123 A1    Sep. 19, 2013

Related U.S. Application Data

(60) Provisional application No. 61/610,837, filed on Mar. 14, 2012.

(51) Int. Cl.
*H04N 5/228* (2006.01)
*H04N 5/232* (2006.01)
*G02B 27/64* (2006.01)

(52) U.S. Cl.
CPC ......... *H04N 5/2327* (2013.01); *H04N 5/23248* (2013.01); *H04N 5/23258* (2013.01); *H04N 5/2328* (2013.01); *G02B 27/644* (2013.01)
USPC ............ 348/208.14; 348/208.99; 348/208.12; 359/198.1; 359/225.1

(58) Field of Classification Search
USPC ........ 348/208.14, 208.12, 208.99; 359/198.1, 359/225.1
See application file for complete search history.

(56) References Cited

U.S. PATENT DOCUMENTS

| | | | |
|---|---|---|---|
| 4,152,729 A | 5/1979 | Hobbs et al. | |
| 6,505,703 B2 * | 1/2003 | Stout et al. | 180/446 |
| 7,796,314 B2 * | 9/2010 | Sutko et al. | 359/198.1 |
| 2004/0046953 A1 | 3/2004 | Nagata | |
| 2008/0017618 A1 * | 1/2008 | Bruland et al. | 219/121.69 |
| 2008/0055413 A1 | 3/2008 | Hayashi | |
| 2013/0332036 A1 * | 12/2013 | Yamamoto et al. | 701/50 |

OTHER PUBLICATIONS

International Search Report for PCT/US2013/029911, mailed Jun. 12, 2013.

(Continued)

*Primary Examiner* — Antoinette Spinks
(74) *Attorney, Agent, or Firm* — Burns & Levinson, LLP; Joseph M. Maraia; Weber Hsiao

(57) ABSTRACT

A feed forward command aiding architecture with corresponding method, system, and computer product are provided. The feed forward command aiding architecture includes generating angle and rate commands from a received inertial data input. The angle command is feed into a proper order position loop producing an intermediate result. An angle feedback is differentiated producing a rate loop feedback. The intermediate result, rate command, and rate loop feedback are then feed into a proper order rate loop producing a torque command. The proper order rate loop is nested inside of the proper order position loop. The torque command being generated moves a beam steering element of an electro-optic sensor to deflect a line of sight of the electro-optic sensor by an angle approximating the received inertial angular input.

21 Claims, 8 Drawing Sheets

(56) References Cited

OTHER PUBLICATIONS

Zdenek et al., "Delay compensation in a dual-rate cascade visual servomechanism", Decision and Control (CDC) 2010 49th IEEE Conference on, IEEE, 2010.

Masten, M.K., "Inertially stabilized platforms for optical imaging systems," IEEE Control Systems Magazine, IEEE Service Center, v. 28, 2008.

* cited by examiner

BEAM STEERING ELEMENT FEED FORWARD COMMAND AIDING ARCHITECTURE

CROSS REFERENCE TO RELATED APPLICATION

This application claims priority to U.S. Provisional Patent Application No. 61/610,837, filed on Mar. 14, 2012. The entire teachings of the above applications are incorporated herein by reference.

BACKGROUND

A requirement in both still and full motion imaging systems or beam director systems is a stable optical axis so that no image degradation or beam motion occurs during scene sampling or beam emission. As optical magnification increases the optical axis stabilization performance requirements increase proportionally. Systems using the highest available magnification to meet the system design requirements correspondingly require the highest performance stabilization systems. In the general case, these stabilization systems are characterized by four or five axis gimbal designs requiring high volume, power, weight, complexity, and cost. An alternative stabilization approach uses a lower order two axis gimbal design with a beam steering element inserted into the optical path of the imaging system. The two axis gimbal uses inertial rate feedback to provide coarse stabilization of the optical axis just as the higher order gimbals. The residual inertial error is then further acted upon by the fine stabilization beam steering process to reject the remaining optical axis deflections and minimize the net residual inertial pointing error. Such a design solution has been successfully implemented and in many cases provides stabilization performance equivalent to or even exceeding that of the higher order gimbal design solutions.

To date the alternative stabilization approach at best can achieve an order of magnitude improvement over a limited frequency region on the coarse two axis gimbal set residual stabilization error. This limitation is a result of the response achieved to date of the beam steering element control methodology.

SUMMARY

In accordance with an example, a feed forward command aiding architecture method includes generating angle and rate commands from a received inertial data input; feeding the angle command into a proper order position loop producing an intermediate result; differentiating an angle feedback producing a rate loop feedback; and feeding the intermediate result, rate command, and rate loop feedback into a proper order rate loop producing a torque command, the proper order rate loop nested inside of the proper order position loop, the torque command being generated moves a beam steering element of an electro-optic sensor to deflect a line of sight of the electro-optic sensor by an angle approximating the received inertial angular input.

In accordance with an example, a feed forward command aiding architecture system includes a generation module configured to generate angle and rate commands from a received inertial data input; a position loop module communicatively coupled to the generation module configured to feed the angle command into a proper order position loop producing an intermediate result; a differentiation module configured to differentiate an angle feedback producing a rate loop feedback; and a rate loop module communicatively coupled to the position loop module and differentiation module configured to feed the intermediate result, rate command, and rate loop feedback into a proper order rate loop producing a torque command, the proper order rate loop nested inside of the proper order position loop, the torque command being generated moves a beam steering element of an electro-optic sensor to deflect a line of sight of the electro-optic sensor by an angle approximating the received inertial angular input.

In accordance with an example, a tangible computer-readable storage medium storing computer readable instructions which when executed by one or more processors cause the one or more processors to generate angle and rate commands from a received inertial data input; feed the angle command into a proper order position loop producing an intermediate result; differentiate an angle feedback producing a rate loop feedback; feed the intermediate result, rate command, and rate loop feedback into a proper order rate loop producing a torque command, the proper order rate loop nested inside of the proper order position loop, the torque command being generated moves a beam steering element of an electro-optic sensor to deflect a line of sight of the electro-optic sensor by an angle approximating the received inertial angular input.

In other examples, any of the aspects above can include one or more of the following features.

In some examples of the method in which the received inertial data input is inertial angular input, generating the angle and rate commands includes differentiating the inertial angular input producing a rate, the rate command being generated based on the produced rate.

In other examples of the method in which the received inertial data input is inertial rate input, generating the angle and rate commands includes integrating the inertial rate input producing an angle, the angle command being generated based on the produced angle.

In some examples of the method, feeding the angle command includes differencing the angle command with the angle feedback producing an error signal, and processing the error signal thru the proper order position loop controller to produce the intermediate result In other examples of the method feeding the intermediate result, rate command, and rate loop feedback into the proper order rate loop includes combining rate command and rate loop feedback producing a rate error signal, the torque command being produced based on the produced rate error signal, and processing the rate error signal thru the proper order rate loop controller to produce the torque command.

In some examples of the method, the proper order position loop and proper order rate loop are proportional plus integral control loops, proportional plus derivative, proportional integral and derivative control loops or combinations thereof.

In other examples of the method, the beam steering element is any one of reflective design and refractive design In some examples of the method, the beam steering element of reflective design includes a two-axis fast steering mirror.

In other examples of the method, the beam steering element of refractive design includes a Risley prism.

In some examples, the method further includes generating an angle feedback based on an angle measured directly using an eddy current sensor, linear variable differential transformer or optical encoder, and differentiating the measured angle producing a rate feedback.

In other examples, the method further includes moving the beam steering element based on the torque command.

In some examples of the system in which the received inertial data input is inertial angular input, the generation module is configured to differentiate the inertial angle input to generate a rate, the rate command being generated based on the produced rate.

In other examples of the system in which the received inertial data input is inertial rate input, the generation module is configured to integrate the inertial rate input producing an angle, the angle command being generated based on the produced angle.

In some examples of the system, the position loop module is further configured to difference the angle command with the angle feedback producing an error signal.

In some examples of the system, wherein the rate loop module is further configured to combine rate commands and rate loop feedback producing a rate error signal, the torque command being produced based on the produced rate error signal.

In other examples of the system, the proper order position loop and proper order rate loop are proportional plus integral control loops, proportional plus derivative, proportional integral and derivative control loops or combinations thereof.

In some examples of the system, the beam steering element is any one of reflective design and refractive design.

In other examples of the system, the beam steering element of reflective design includes a two-axis fast steering mirror.

In some examples of the system, the beam steering element of refractive design includes a Risley prism.

In other examples, the system further includes an eddy current sensor, linear variable differential transformer or optical encoder measuring an angle, directly, and the differentiation module further configured to differentiate the measured angle producing a rate feedback.

In some examples, the system further includes an actuator moving the beam steering element based on the torque command.

DESCRIPTION

A feed forward command aiding architecture or simply "the architecture" includes technology that, generally, directs a beam steering element that is placed within the optical path of an electro-optic sensor, such as a camera or laser, to move and stabilize the line of sight of the sensor in response to a detected inertial angle change in the line of sight. The technology is used to reject base motion disturbance (e.g., linear and angular deflections) found in a number of civilian and military applications in which an electro-optic sensor (e.g., camera, laser, etc.) is mounted on a vehicle. Example applications of the technology including mounting a camera or laser to a fix or rotary winged aircraft. Other examples include electro-optic sensors mounted on aerostats and mast mounted sights. Still other examples include electro-optic sensor mounted on ground or water borne vehicles.

In operation, the technology enables, for example, a shaking camera mounted to a police helicopter to take an image of a suspect car that is stabilized and clear enough to read the license plate.

The technology advantageously utilizes a position loop and a rate loop nested within the position loop, each operating independently on coherent signals, to increase disturbance rejection, thereby decreasing image imperfections, such as image motion, image blurring, and multiple images.

By increasing disturbance rejection, the technology advantageously enables an electro-optic sensor to be mounted on a vehicle that was previously unsuitable for installation because of excessive base motion disturbance.

Another advantage of the technology is that an electro-optic sensor can be mounted on a greater variety of vehicles and/or can be mounted on a greater number of locations on a given vehicle without changes to the hardware of the electro-optic sensor or of the vehicle. The technology increases the field of use and provides betters results.

Figure 1:
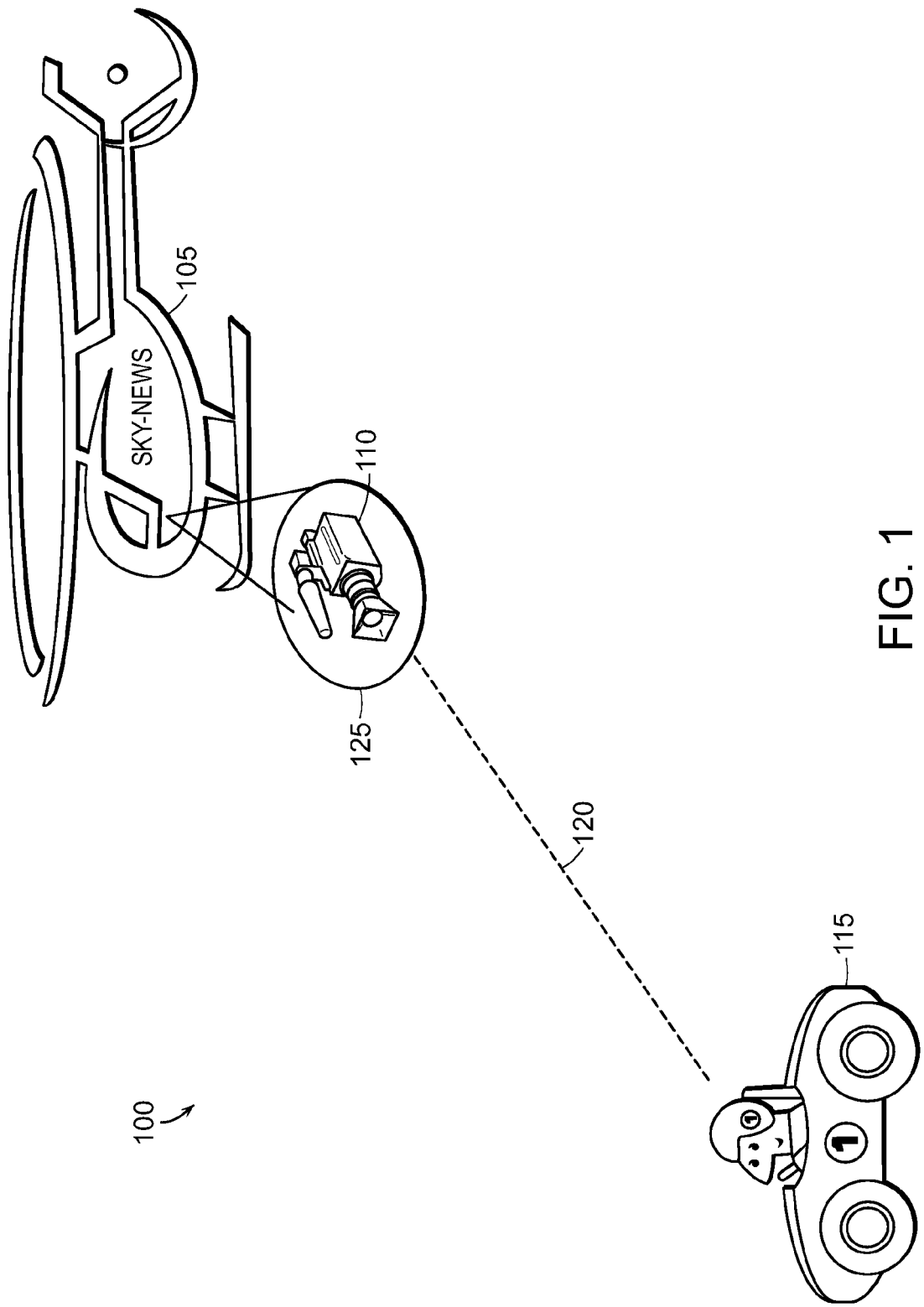
FIG. 1 is a diagram of an example vehicle-mounted electro-optic sensor environment.

FIG. 1 shows an example vehicle-mounted electro-optic sensor environment 100. The environment 100 includes a vehicle 105 (e.g., helicopter, airplane, etc.), electro-optic sensor 110 (e.g., camera, laser, etc.), and object 115 (e.g., car, tank, person, etc). The electro-optic sensor 110 is attached to the vehicle 105 by way of a mounting base on the (host) vehicle 105. The electro-optic sensor 110 may be a receiver, such as a camera, or transmitter, such as a laser.

In the example shown in FIG. 1, the electro-optic sensor 110 is a camera that takes images of the object 115 while the vehicle 105 is in operation. While this and other examples are described in reference to a camera, it should be readily apparent that the examples also apply a laser (or other electro-optic transmitter). In the case of a laser, the "image" is a laser dot projected onto the object.

To provide steady images of the object 115, an optical axis or "line of sight" 120 of the electro-optic sensor 110 must be constant relative to the object 115 being imaged. Any change to the line of sight 120 results in the image moving (referred as image or scene motion) or, in some instances, a blurry image.

Changes to the line of sight 120 of the electro-optic sensor 110 can arise because of linear and angular deflections of the mounting base of the vehicle 105 to which the electro-optic sensor 110 is mounted. These kinds of deflections are collectively called "base motion disturbance." Base motion disturbance is typically characterized by a frequency (or range of frequencies) and amplitude torque disturbance represented as a time history or power spectral density plot.

The base motion disturbance may be cancelled by a stabilization system. The stabilization system generally consists of a gimbal set coupled with a beam steering element inserted into the optical path of an electro-optic sensor to stabilize (or, in some cases, augment and refine stabilization) of the optical axis of the electro-optic sensor, and thereby cancel or reduce base motion disturbance. Such action by the stabilization system is called "disturbance rejection." How well the stabilization system performs disturbance rejection can be expressed in decibels (db).

The beam steering element of the stabilization system may be one of a reflective design/architecture or refractive design/architecture. One skilled in the art should readily recognize the stabilization approach and its examples described herein apply, generally, to beam steering elements of both reflective and refractive designs. For example, the described stabilization approach may be applied to a two axis fast steering mirror (an example of a reflective beam steering element) or to a dual Risley prism solution (an example of a refractive beam steering element). The stabilization approach may also be applied to other reflective and refractive beam steering elements.

Briefly, a fast steering mirror is a high resolution beam steering device consisting of a movable mirror (or in some cases, a deformable mirror) that redirects a laser beam/image by reflection. A Risley prism is a high resolution beam steering device consisting of a pair of rotatable wedged elements that redirect a laser beam/image by refraction. By rotating each wedge independently, the laser beam can be steered to any position within a solid angle defined by a maximum deflection image.

FIG. 1 shows an example stabilization system 125 associated with or part of the electro-optic sensor 110. The stabilization system 125 includes gimbals (not shown) and a beam steering element (not shown) that are used together according to a nested control methodology. In a typical fashion, an outer 2 axis gimbal set provides coarse stabilization and a nested/isolated 2 or more axis inner gimbal set or beam steering element provides fine stabilization. In terms of levels of base motion disturbance or "base motions levels," the outer gimbals act on "starting base motion levels" at the mounting point(s) of the stabilization system. The result is "intermediate base motion levels" at the outer gimbals, which may be still unacceptable for the required performance of some applications. The inner gimbal set or beam steering element act on intermediate base motion levels. The result is "residual base motion levels" on the line of sight of the electro-optic sensor, which are acceptable for the required performance of some applications. Of interest here is the beam steering element and the observation that increasing the rejection performance at the beam steering element enables greater tolerance to starting and intermediate base motion levels observed by the stabilization system 125.

The beam steering element moves, dynamically, to steer the line of sight of the electro-optic sensor. The technology includes a routine called a "beam steering control loop" or simply "control loop" that when executed by a computer (or similar processing device) directs the beam steering element to move to steer the line of sight of the electro-optic sensor.

Figure 2:
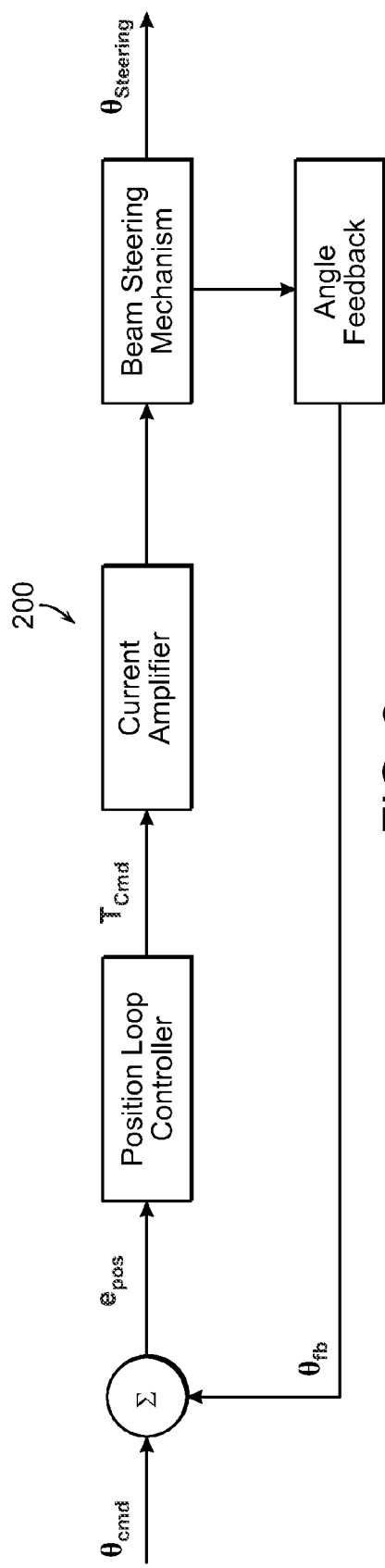
FIG. 2 is a block diagram of a typical beam steering element control loop.

FIG. 2 shows a typical beam steering element control loop 200 that is well known in the art. The control loop 200 uses a position loop controller for torque command generation to a current amplifier. In situations of severe base motion disturbance, beam steering control loops, such as the one shown in FIG. 2 generally do not provide adequate disturbance rejection for base motion disturbances over a certain frequency (or range of frequencies) and amplitude.

Figure 3:
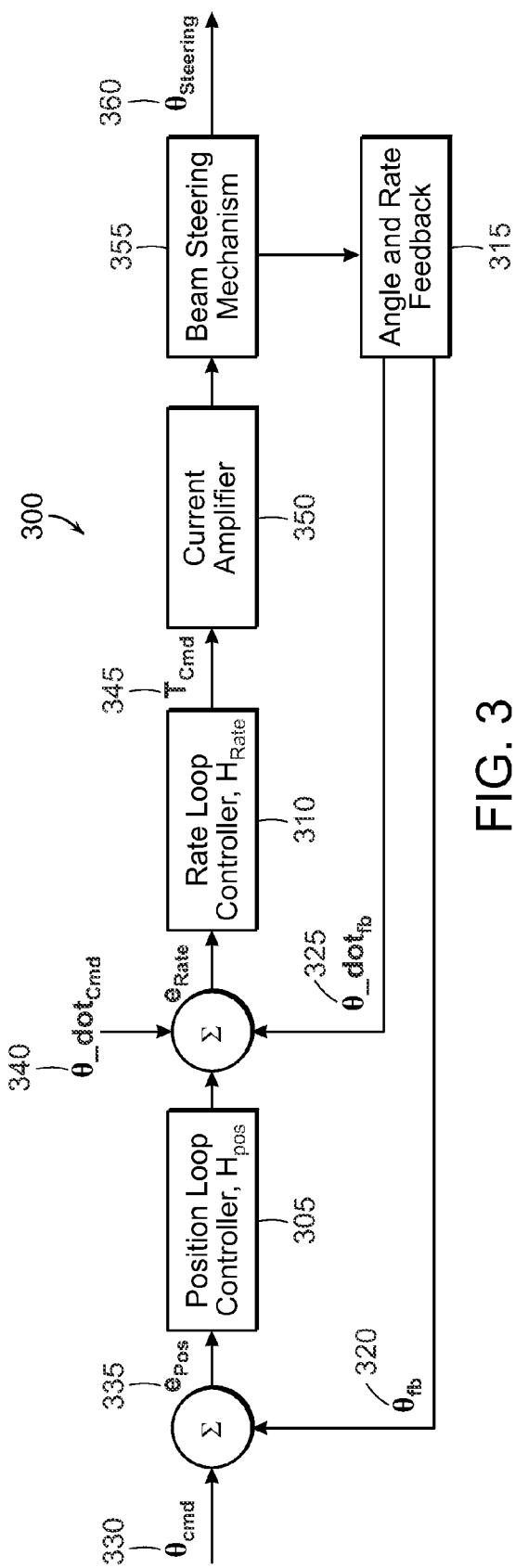
FIG. 3 is a block diagram of a feed forward command aiding architecture according to the examples described herein.

FIG. 3 shows a feed forward command aiding architecture 300 according to the examples described herein. For ease of reference, the architecture 300 (and its examples) is described as performing acts (or steps). In practice, the architecture 300 is implemented by a feed forward command aiding architecture system (and its components or modules) and the system performs these acts. The feed forward command aiding architecture system or simply "the system," may be part of a stabilization system (e.g., the stabilization system 125 of FIG. 1).

The architecture 300 includes a position loop controller 305 for a position loop and a rate loop controller 310 for a rate loop that is nested inside of the position loop. The architecture also includes an angle and rate feedback mechanism 315 for providing the position loop controller 305 with angle feedback ($\theta_{fb}$) 320 and for providing the rate loop controller 310 with rate feedback ($\theta\_dot_{fb}$) 325.

In some examples of the architecture 300, the position and rate loops are "proper order loops" including proportional plus integral control loops, proportional plus derivative, proportional integral and derivative control loops or combinations thereof.

An angle command ($\theta_{cmd}$) 330 is generated from an inertial angular input. The angle command ($\theta_{cmd}$) 330, together with the angle feedback ($\theta_{fb}$) 320, are inputs for the position loop controller 305. Output for position loop controller is an intermediate result called "position loop compensation," which is one of the inputs for the rate loop controller 310.

Examples of the architecture 300 receive inertial data input as angle or rate. In examples in which the received inertial data input is inertial angular input, the architecture 300 differentiates the inertial angular input to produce a rate. The rate command 340 is then generated based on the produced rate. In other examples in which the received inertial data input is inertial rate input, the architecture 300 integrates the inertial rate input to produce an angle. The angle command 330 is then generated based on the produced angle.

Another input for the rate loop controller 310 is a rate command ($\theta\_dot_{cmd}$) 340. Like the angle command ($\theta_{cmd}$) 330, the rate command ($\theta\_dot_{cmd}$) 340 is generated from the same inertial angular input. As such, the angle command ($\theta_{cmd}$) 330 and rate command ($\theta\_dot_{cmd}$) 340 are said to be "coherent commands." The rate command ($\theta\_dot_{cmd}$) 340 is fed forward of the position loop controller 305 and into the rate loop controller 310. "Feed forward" aiding or augmenting the response of a control loop by feeding an additional command forward in the control loop assists the command tracking capability and results in better performance of the control loop (described later in greater detail).

The other input for the rate loop controller is the rate feedback ($\theta\_dot_{fb}$) 325 provided by the angle and rate feedback mechanism. In some examples, the rate feedback ($\theta\_dot_{fb}$) 325 is provided by differentiating an angle. Some examples system measure the angle differentiated, directly, using an eddy current sensor, linear variable differential transformer, optical encoder or the like.

Output for rate loop controller 310 is a torque command ($T_{cmd}$) 345 for a current amplifier 350. In some examples, the torque command ($T_{cmd}$) 345 is based on a rate error signal. A convenient example of the of the architecture 300 combines the rate command ($\theta\_dot_{cmd}$) 340 and rate loop feedback ($\theta\_dot_{fb}$) 325 to produce the rate error signal.

In response to the torque command ($T_{cmd}$) 345, the current amplifier 350 sends current to the actuators of a beam steering element mechanism 355 which produce a torque to deflect the line of sight of an electro-optic sensor by value $\theta_{steering}$ 360 in an attempt to track the inertial angular input.

The collective result of the position loop 305 and inner rate loop 310 of the architecture 300 working on coherent commands, as described above, is a lower residual control loop error that manifests itself as an increase in base motion disturbance rejection. In operation, using the architecture 300 to increase base motion disturbance rejection makes images, which previously appeared shaky and/or blurry, appear steadier and/or clearer.

Figure 4:
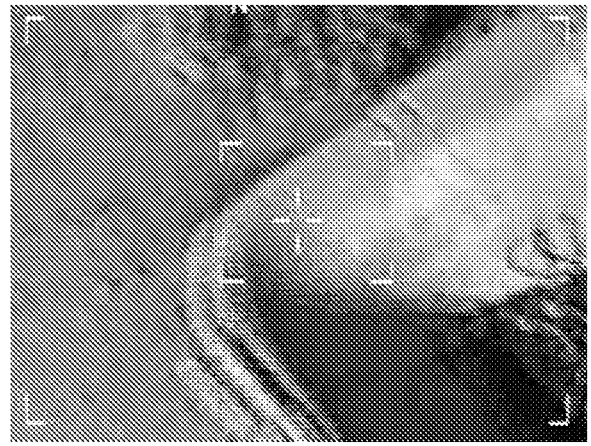
FIG. 4 is an image taken by an airplane-mounted camera that is stabilized by a typical beam steering element control loop.

FIG. 4 shows an image of a desert landscape taken by a camera mounted on an airplane. The line of sight of the camera is stabilized, in part, by a beam steering element. Movement of the beam steering element is directed by a current state-of-the-art control loop, such as the one described in reference to FIG. 2.

Even with the beam steering element stabilizing the image, significant image tearing is observed (seen as a double image) due to the interlaced NTSC video field rate of 60 Hz being affected by the 31 Hz fundamental tone of the propeller of the airplane. In this representative example, image residual tearing on the order of 20 to 30 pixels, peak to peak, is common when the camera is looking towards either the wing of the airplane and down at steeper depression angles where kinematic coupling maximizes the base motion disturbance coupling.

Figure 5:
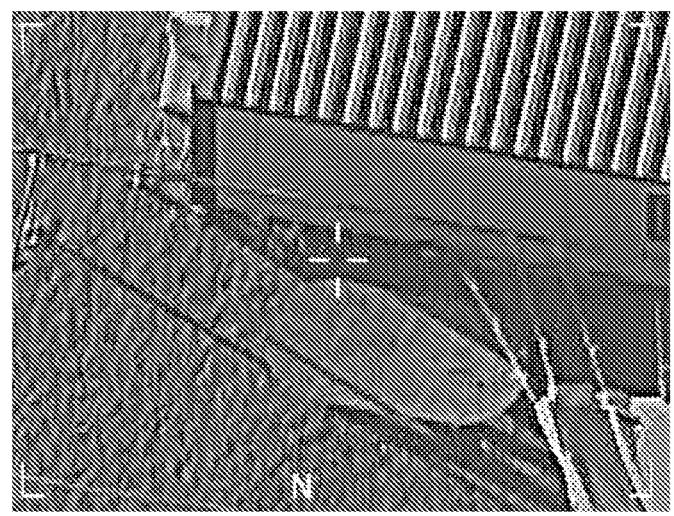
FIG. 5 is an image taken by an airplane-mounted camera that is stabilized by a feed forward command aiding architecture, in accordance with the examples described herein. The airplane type is the same as in FIG. 4 and thus the base motion disturbance environment is the same for the two images.

FIG. 5 shows an image of a utility building taken by a camera mounted on the same type of airplane as in FIG. 4, and, thus, the base motion disturbance environments are equivalent. The line of sight of the camera is stabilized, in part, by a beam steering element. Movement of the beam steering element is being directed by a feed forward command aiding architecture according to the examples described herein, such as the architecture 300 described with reference to FIG. 3.

The image of FIG. 5 exhibits significant improvement over the image of FIG. 4. In the image of FIG. 5, image tearing in both axes is greatly reduced when compared with the image of FIG. 4 due to the increased disturbance rejection capability of the architecture 300.

Figure 6:
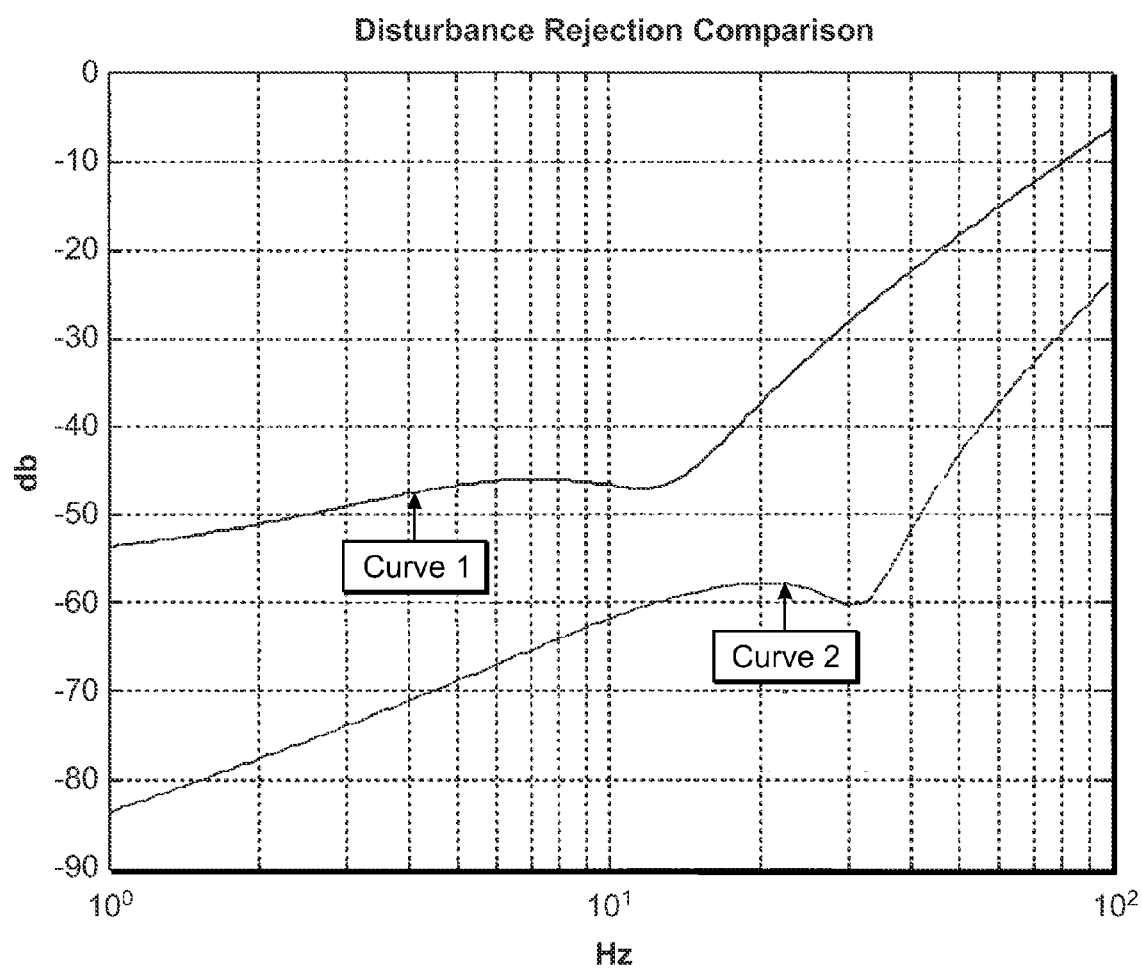
FIG. 6 is a graph comparing disturbance rejection capabilities.

FIG. 6 shows a detailed comparison of the disturbance rejection capabilities by various control loop approaches. The disturbance rejection performance of the typical control loop is shown as curve 1 and of the architecture 300 (and it's examples) is shown as curve 2. At a base motion disturbance of 30 Hz, the disturbance rejection by the architecture 300 (approximately −60 db) is about 32 db lower than the disturbance rejection by the typical control loop (approximately −28 db). This corresponds to the feed forward command aiding architecture 300 providing better than a 10 fold improvement in disturbance rejection over the typical control loop. Consequently, the feed forward command aiding architecture 300 is a solution for a severe base motion disturbance environment for which the typical control loop is inadequate or unsuitable.

By adding command aiding in addition to adding a rate loop and differentiator for rate feedback, the feed forward command aiding architecture 300 leverages a maximized rate loop bandwidth, which is described in detail below. The result is a minimized position loop error as the shown by curve 2 in FIG. 6.

A feed forward command aiding architecture according to the examples describe herein advantageously minimizes beam steering element position loop error (or track loop error). With reference to FIG. 3, if the rate loop response and rate loop command match perfectly, then the beam steering element position loop angular error term $e_{pos}$ is 0. However, it is challenging to match the rate loop command and rate loop response perfectly because it requires infinite bandwidth. In practice, increasing the rate loop bandwidth is achievable because the loop controller is a lower order polynomial, which generally enables higher bandwidth capability due to less gain and phase correction requirements. The effect of maximizing rate loop bandwidth, as just described, coupled with feed forward rate command aiding using a coherent angle and rate commands derived from an inertial angular input, is the beam steering element position loop angular error term $e_{pos}$ is minimized. The foregoing description can be expressed, mathematically, by the following series of equations.

With reference to FIG. 3, solving for the rate loop error quantity $e_{rate}$:

$$e_{rate} = \theta\_dot_{cmd} + H_{pos} * e_{pos} - \theta\_dot_{fb}$$

By re-arranging terms the position loop error $e_{pos}$ is quantified as:

$$e_{pos} = (e_{rate} - \theta\_dot_{cmd} + \theta\_dot_{fb})H_{pos}$$

If the rate loop bandwidth is maximized so that $e_{rate} \to 0$ one can solve for:

$$e_{pos} \approx (\theta\_dot_{fb} - \theta\_dot_{cmd})/H_{pos}$$

In the command generation for $\theta\_dot_{cmd}$ one can apply frequency domain shaping techniques over the specific frequency region of interest so that we can tune to $\theta\_dot_{cmd} \to \theta\_dot_{fb}$, then over the specific tuning region of interest one can drive:

$$|e_{pos}| \approx 0$$

In essence, because there are two separate control loops working on correlated error terms, the frequency domain shaping of $H_{pos}$ and $H_{rate}$ is tuned so that a frequency region is chosen where the position loop error term $e_{pos}$ is mathematically driven to zero. The ability to pick this zero error point is an extremely powerful tool for the designer because that point can be specifically chosen for each installation application. For example the exact same system can be tuned to reject the blade passage frequency for a fixed wing aircraft while alternatively be tuned for the main rotor blade passage frequency of a rotary wing aircraft. The system merely needs to have the installation environment communicated to the stabilization subsystem and the appropriate application specific tuning will be automatically chosen to maximize the disturbance rejection at the desired frequency region.

Figure 7:
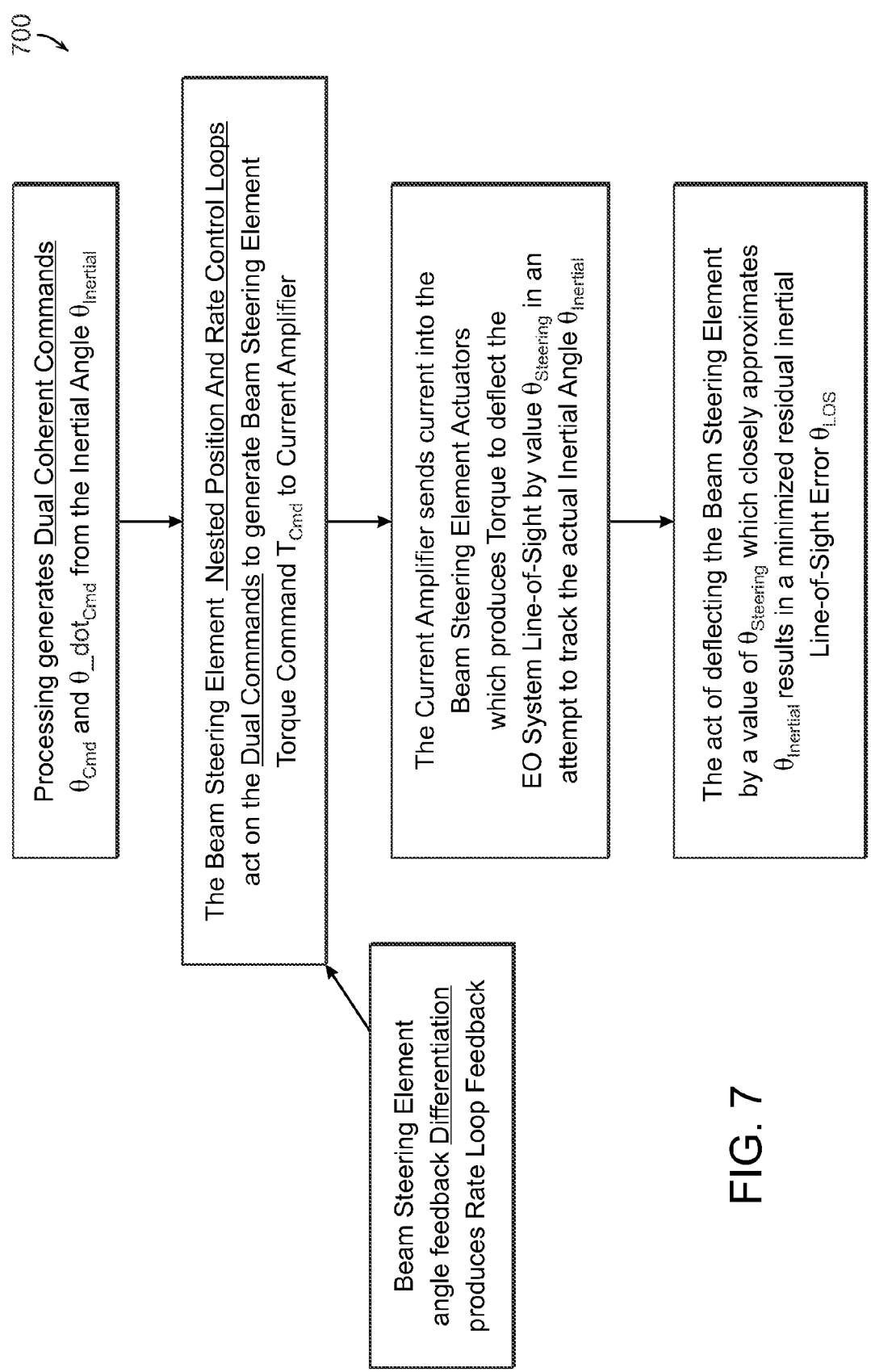
FIG. 7 is a flowchart of an example feed forward command aiding procedure.

FIG. 7 shows an example feed forward command aiding procedure 700 using, for example, a processor of a feed forward command aiding architecture system (described below in greater detail). Generally, the system generates rate and angle commands from a received inertial source (or input). If angle information (inertial angular input is received, then the rate command is the first time derivative of the angle command. If rate information is received, then the angle command is the integral of the rate command.

The system then feeds the angle command into a proper order position loop producing an intermediate result. The system also differentiates an angle feedback producing a rate loop feedback.

The system then feeds the intermediate result, rate command, and rate loop feedback into a proper order rate loop producing a beam steering element torque command. The proper order rate loop is nested inside of the proper order position loop. In some examples of the system, the proper order rate and position loops are proportional plus integral control loops, proportional plus derivative, proportional integral and derivative control loops or combinations of them.

The generated torque command moves a beam steering element of an electro-optic sensor to deflect a line of sight of the electro-optic sensor by an angle approximating the received inertial angular input. The system, acting on coherent dual commands through nested beam steering element rate and position control loops in a mulitplicative fashion, produces a more accurate beam steering element tracking response resulting in a further minimization of the line of sight error ($\theta_{LOS}$).

By minimizing $\theta_{LOS}$, the system increases base motion disturbance rejection. In turn, the system advantageously enables an electro-optic sensor to be mounted on a vehicle that was previously unsuitable for installation because of excessive base motion disturbance. In addition, the system advantageously enables the electro-optic sensor to be mounted on a greater number of locations on a given vehicle without requiring changes to the hardware of the electro-optic sensor, stabilization system (e.g., the stabilization system described in reference to FIG. 2), vehicle (e.g., mounting base), or any combination thereof.

Figure 8:
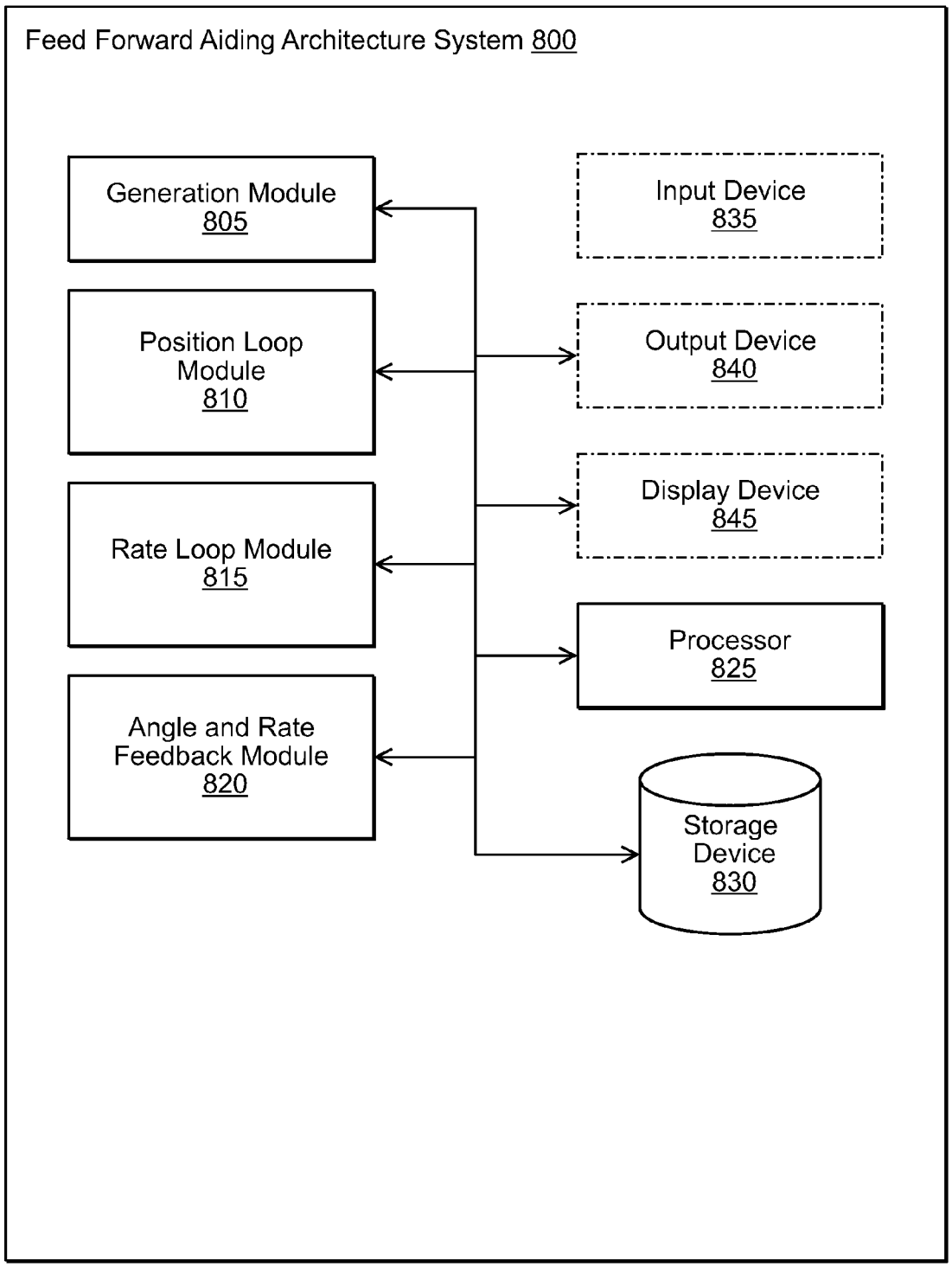
FIG. 8 is a block diagram of an example system implementing a feed forward command aiding procedure.

FIG. 8 shows an example system 800 for implementing a feed forward command aiding procedure, such as the one shown in reference to FIG. 7. The system 800 includes a generation module 805, a position loop module 810, a rate loop module 815, an angle and rate feedback module 820, a processor 825, and a storage device 830, communicatively coupled to each other, as shown in FIG. 8.

The modules and devices described herein can, for example, uses the processor 825 to execute computer executable instructions and/or include a processor to execute computer executable instructions (e.g., an encryption processing unit, a field programmable gate array processing unit, etc.). It should be understood that the system 800 can include, for example, other modules, devices, and/or processors known in the art and/or varieties of the illustrated modules, devices, and/or processors. An input device 835, output device 840, and/or display 845 are optional components of the system 800.

Although FIG. 8 illustrates the system 800 as including the separate modules described herein, the modules can be embedded within other modules. As described above, in reference to FIG. 7, the feed forward command aiding procedure 700 can include a plurality of steps and the system 800 can include other modules and devices configured to process the steps within the feed forward command aiding procedure.

The generation module 805 generates rate and angle commands from a received inertial angular input. The generated rate command relates to the first time derivative of the generated angle command. The position loop module 810 reacts to the generated angle command by feeding the angle command into a position loop producing an intermediate result. The differentiation module differentiates an angle feedback producing a rate loop feedback. The rate loop module 820 feeds the intermediate result, rate command, and rate loop feedback into a proper order rate loop producing a torque command, the proper order rate loop nested inside of the proper order position loop, the torque command being generated moves a beam steering element of an electro-optic sensor to deflect a line of sight of the electro-optic sensor by an angle approximating the received inertial angular input.

Figure 9:
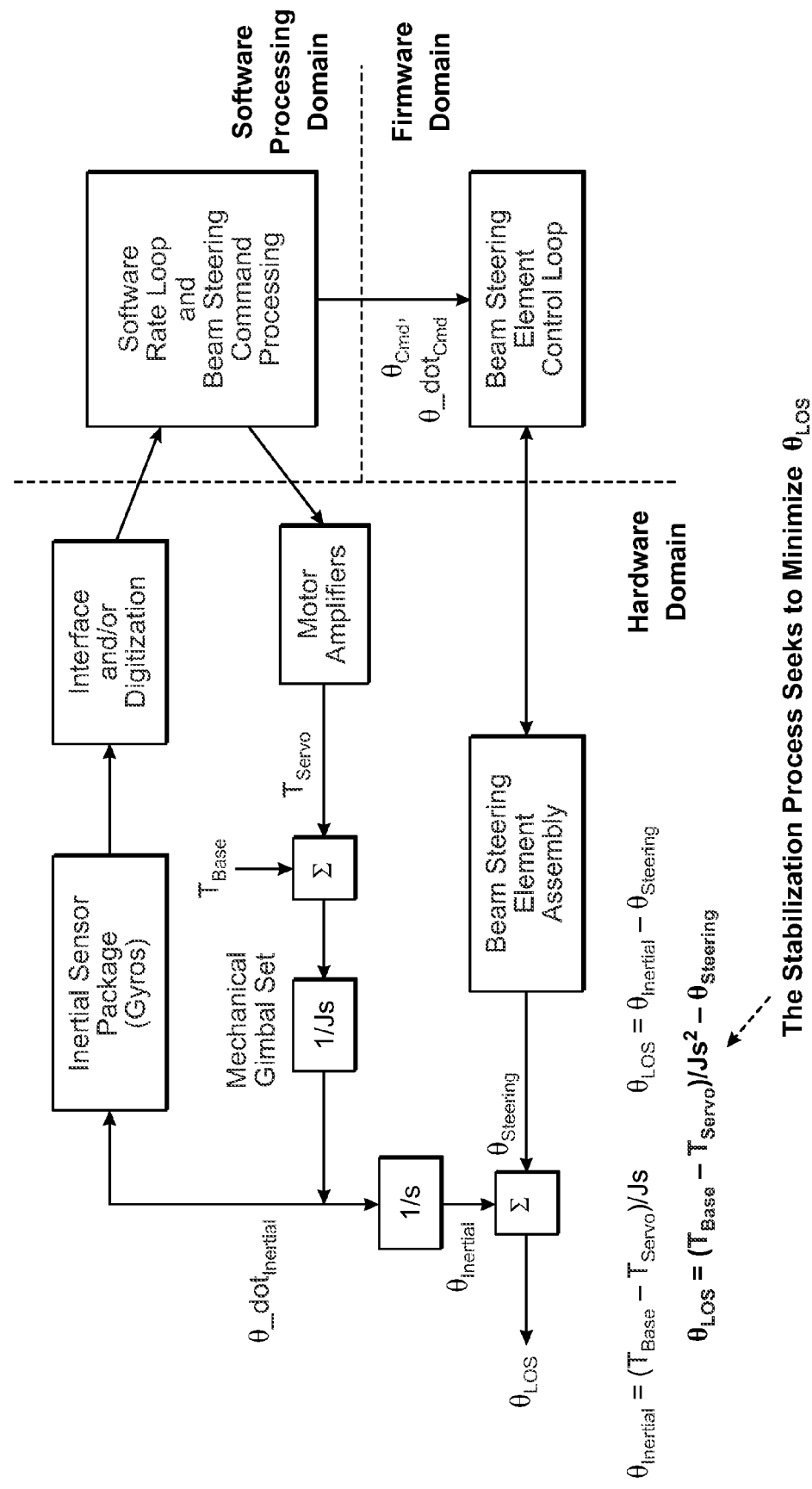
FIG. 9 is a block diagram of an example stabilization system including a feed forward command aiding architecture, in accordance with the examples described herein.

FIG. 9 shows an example stabilization system 9000 including a feed forward command aiding architecture, such as the one described in reference to FIG. 3.

Figure 10:
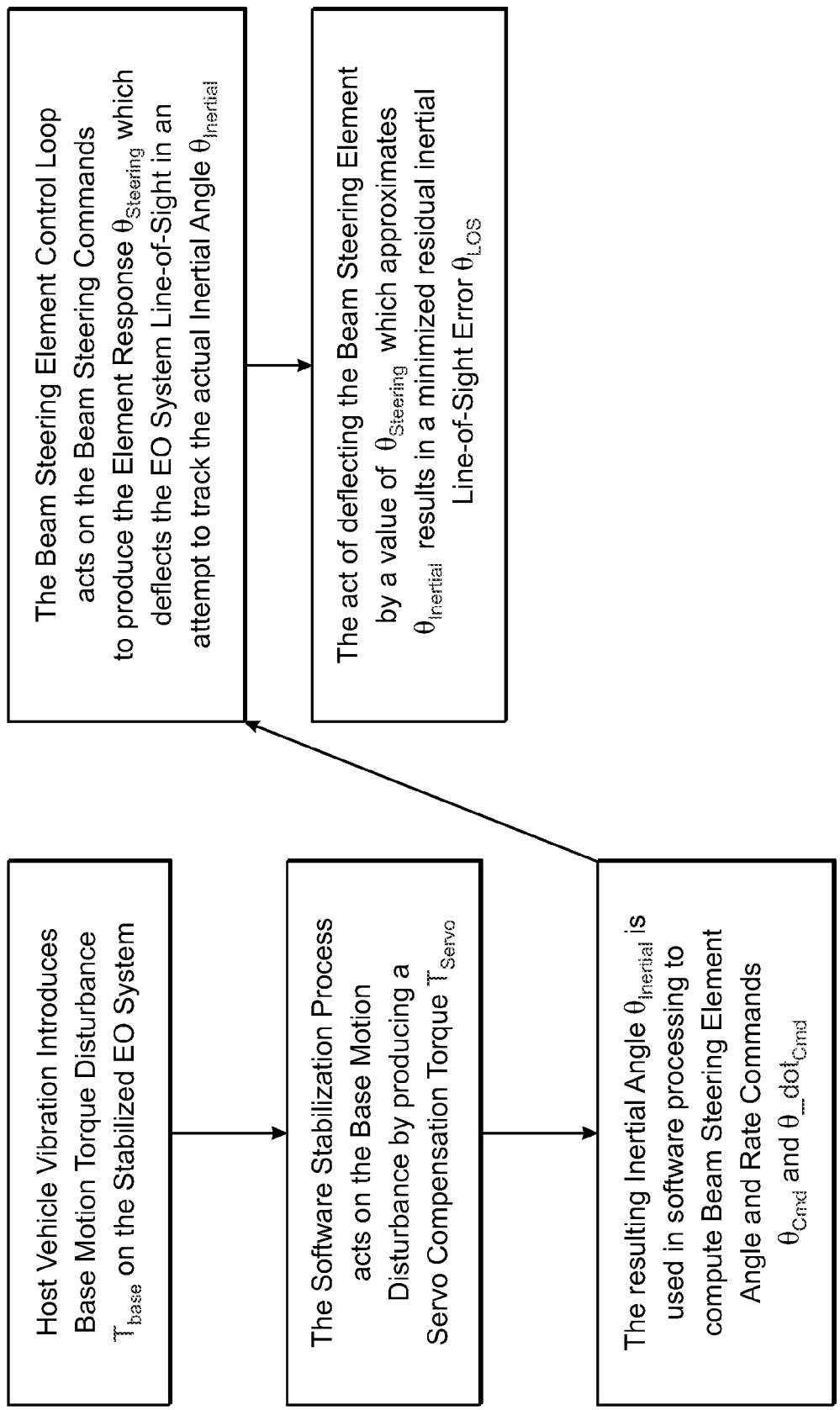
FIG. 10 is a flow chart of an example feed forward command aiding architecture in the context of an example electro-optic sensor stabilization system process flow.

FIG. 10 shows a feed forward command aiding procedure 1000, such as the one described in reference to FIG. 7, in the context of example electro-optic sensor stabilization system process flow. The processor 825 of the feed forward command aiding architecture system 800 (described above in reference to FIG. 8) may carry out the feed forward command aiding procedure.

As described above, a refined control approach has been devised to increase the response of a beam steering element. Some examples of the approach use existing hardware designs and components and require no hardware updates. Such examples are an alternative computational control methodology. The increased responsivity of the beam steering element results in increased disturbance rejection capability of the fine stabilization beam steering process and has been demonstrated to achieve another order of magnitude or better of disturbance rejection capability over the same frequency regions of interest as the classical beam steering solution.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A feed forward command aiding architecture method, the method comprising:
    generating angle and rate commands from a received inertial data input;
        feeding the angle command into a proper order position loop producing an intermediate result;
        differentiating an angle feedback producing a rate loop feedback;
        feeding the intermediate result, rate command, and rate loop feedback into a proper order rate loop producing a torque command, the proper order rate loop nested inside of the proper order position loop; and
        moving a two-axis beam steering element of an electro-optic sensor based on the torque command to deflect a line of sight of the electro-optic sensor by an angle approximating the received inertial angular input.

2. The method of claim 1 wherein the received inertial data input is inertial angular input, and generating the angle and rate commands includes differentiating the inertial angular input producing a rate, the rate command being generated based on the produced rate.

3. The method of claim 1 wherein the received inertial data input is inertial rate input, and generating the angle and rate commands includes integrating the inertial rate input producing an angle, the angle command being generated based on the produced angle.

4. The method of claim 1 wherein feeding the angle command includes differencing the angle command with the angle feedback producing an error signal; and processing the error signal thru the proper order position loop controller to produce the intermediate result.

5. The method of claim 1 wherein feeding the intermediate result, rate command, and rate loop feedback into the proper order rate loop includes combining rate command and rate loop feedback producing a rate error signal, the torque command being produced based on the produced rate error signal, and processing the rate error signal thru the proper order rate loop controller to produce the torque command.

6. The method of claim 1 wherein the proper order position loop and proper order rate loop are proportional plus integral control loops, proportional plus derivative, proportional integral and derivative control loops or combinations thereof.

7. The method of claim 1 wherein the two-axis beam steering element is any one of reflective design or refractive design.

8. The system of claim 7 wherein the two-axis beam steering element of reflective design includes a two-axis fast steering minor.

9. The system of claim 7 wherein the two-axis beam steering element of refractive design includes a Risley prism.

10. The method of claim 1 further comprising generating an angle feedback based on an angle measured directly using an eddy current sensor, linear variable differential transformer or optical encoder; and
    differentiating the measured angle producing a rate feedback.

11. A feed forward command aiding architecture system, the system comprising:
    a generation module configured to generate angle and rate commands from a received inertial data input;

a position loop module communicatively coupled to the generation module configured to feed the angle command into a proper order position loop producing an intermediate result;

a differentiation module configured to differentiate an angle feedback producing a rate loop feedback;

a rate loop module communicatively coupled to the position loop module and differentiation module, the rate loop module configured to feed the intermediate result, rate command, and rate loop feedback into a proper order rate loop producing a torque command, the proper order rate loop nested inside of the proper order position loop; and a two-axis beam steering mechanism communicatively coupled to the rate loop module and in the forward path of the proper order rate loop, the two-axis beam steering mechanism configured to move a two-axis beam steering element of an electro-optic sensor in response to the torque command to deflect a line of sight of the electro-optic sensor by an angle approximating the received inertial angular input.

12. The system of claim 11 wherein the received inertial data input is inertial angular input, and the generation module configured to differentiate the inertial angular input producing a rate, the rate command being generated based on the produced rate.

13. The system of claim 11 wherein the received inertial data input is inertial rate input, and the generation module configured to integrate the inertial rate input producing an angle, the angle command being generated based on the produced angle.

14. The system of claim 11 wherein the position loop module is further configured to difference the angle command with the angle feedback producing an error signal.

15. The system of claim 11 wherein the rate loop module is further configured to combine rate commands and rate loop feedback producing a rate error signal, the torque command being produced based on the produced rate error signal.

16. The system of claim 11 wherein the proper order position loop and proper order rate loop are proportional plus integral control loops, proportional plus derivative, proportional integral and derivative control loops or combinations thereof.

17. The system of claim 11 wherein the two-axis beam steering element is any one of reflective design or refractive design.

18. The system of claim 17 wherein the two-axis beam steering element of reflective design includes a two-axis fast steering minor.

19. The system of claim 17 wherein the two-axis beam steering element of refractive design includes a Risley prism.

20. The system of claim 11 further comprising an eddy current sensor, linear variable differential transformer or optical encoder measuring an angle, directly; and the differentiation module further configured to differentiate the measured angle producing a rate feedback.

21. A computer program product, tangibly embodied in a non-transitory information carrier, the computer program product including instructions being operable to cause a data processing apparatus to:

generate angle and rate commands from a received inertial data input;

feed the angle command into a proper order position loop producing an intermediate result;

differentiate an angle feedback producing a rate loop feedback;

feed the intermediate result, rate command, and rate loop feedback into a proper order rate loop producing a torque command, the proper order rate loop nested inside of the proper order position loop; and command a two-axis beam steering mechanism to move a two-axis beam steering element of an electro-optic sensor based on the torque command to deflect a line of sight of the electro-optic sensor by an angle approximating the received inertial angular input.

* * * * *